Nov. 13, 1962   J. F. HERN ET AL   3,063,750
ADJUSTABLE SUPPORT FOR BACK CUSHION
Filed April 18, 1960   3 Sheets-Sheet 3
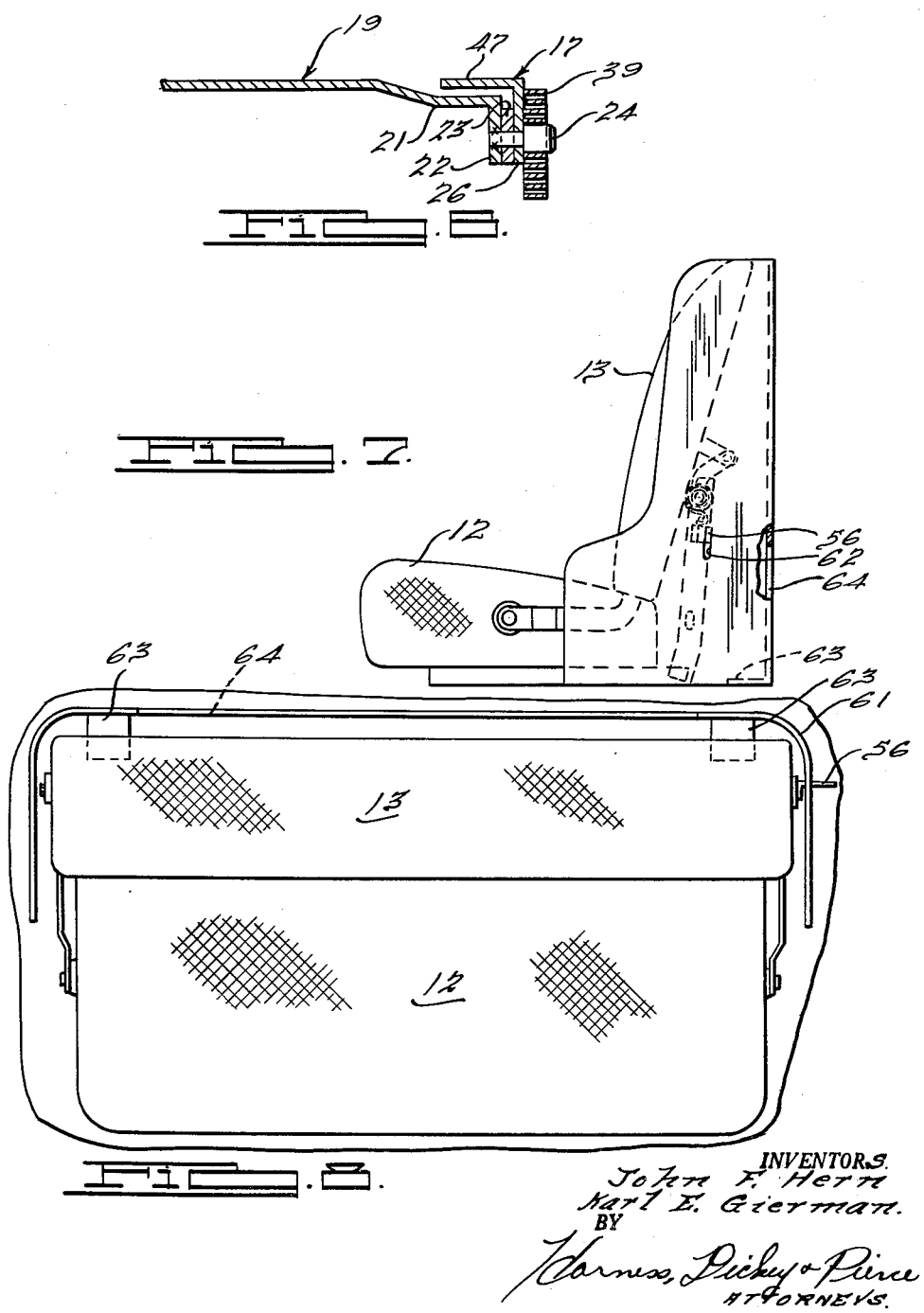
INVENTORS.
John F. Hern
Karl E. Gierman
BY
Harness, Dickey & Pierce
ATTORNEYS.

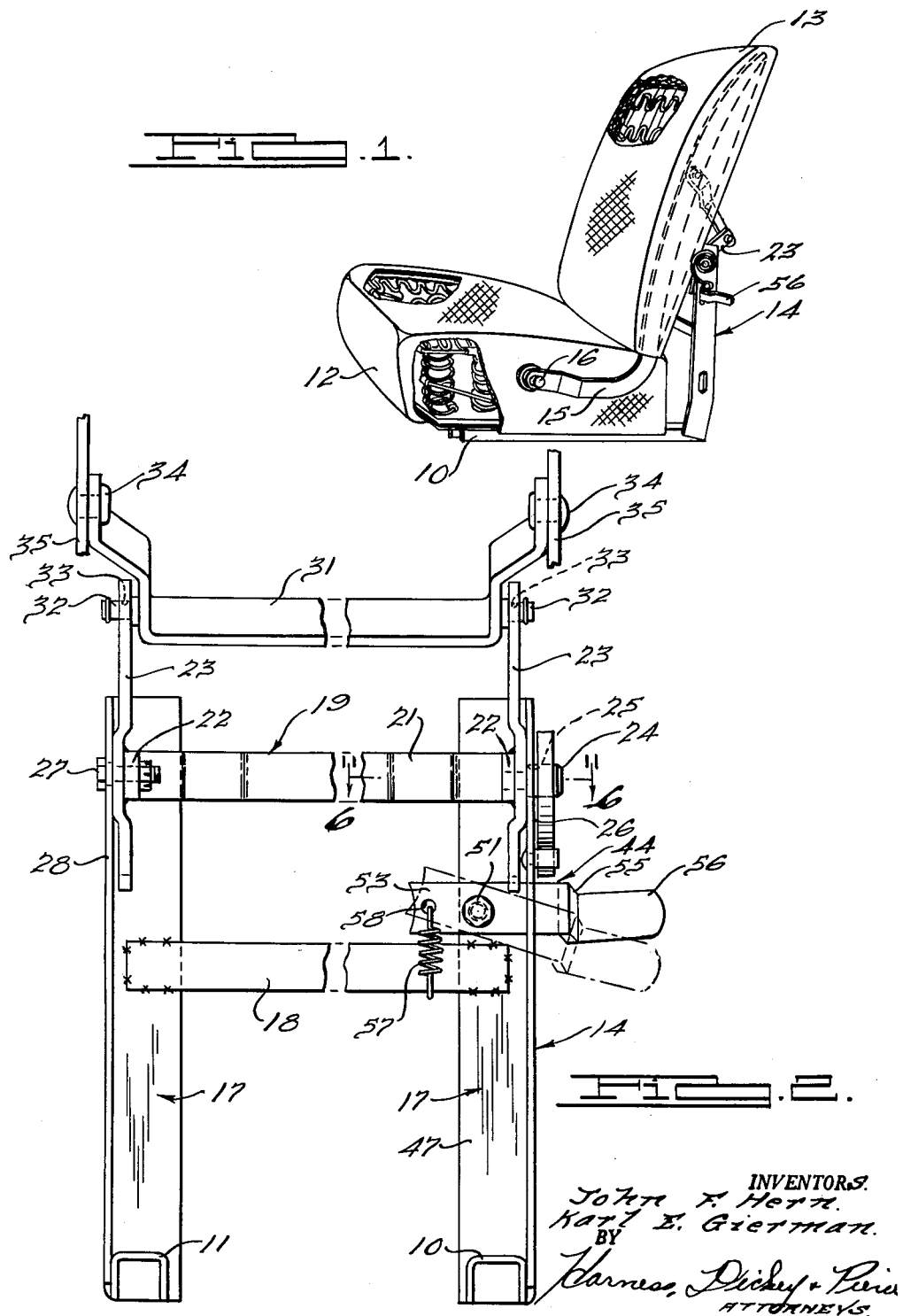

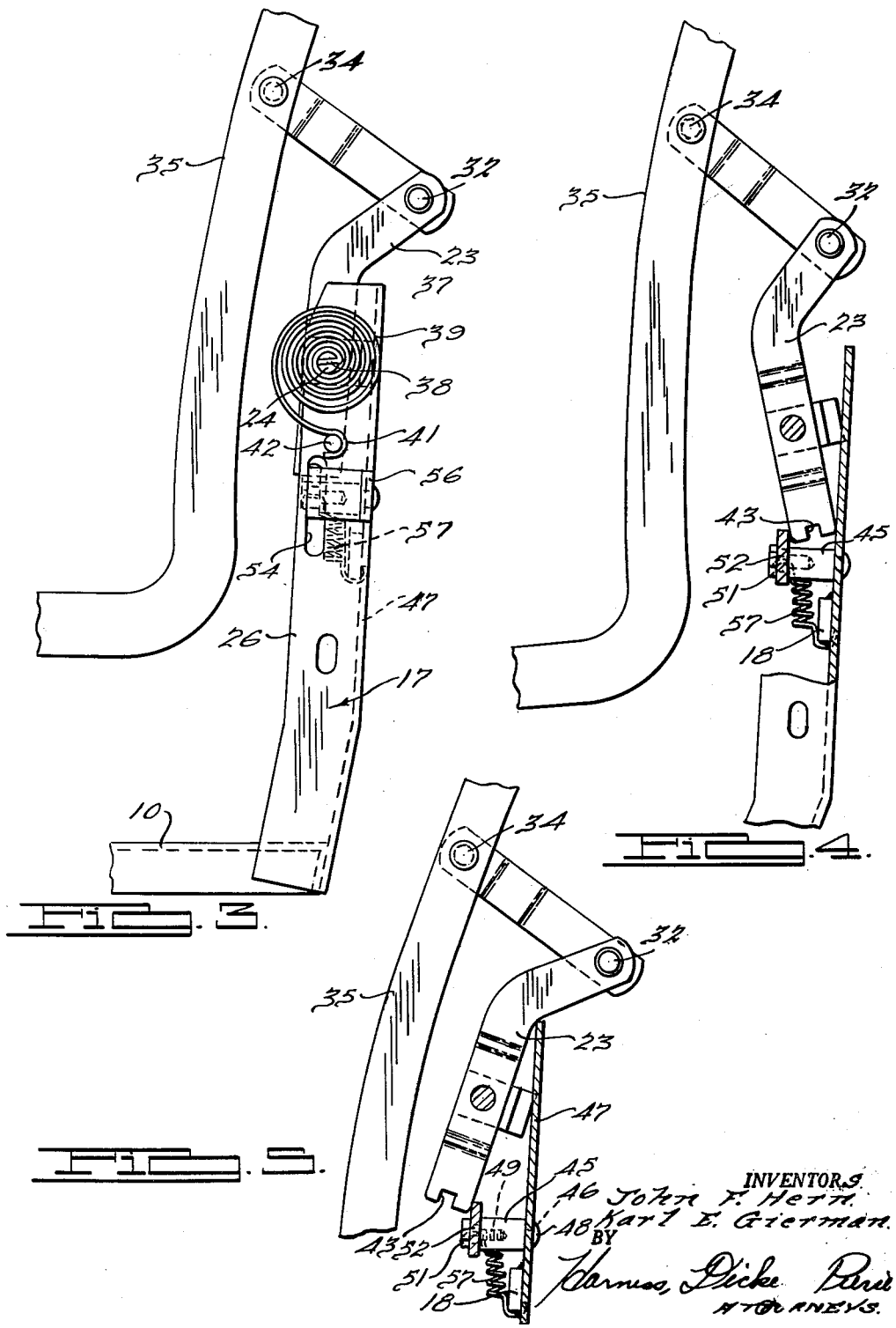

United States Patent Office 3,063,750
Patented Nov. 13, 1962

3,063,750
ADJUSTABLE SUPPORT FOR BACK CUSHION
John F. Hern, Birmingham, and Karl E. Gierman, Livonia, Mich., assignors to American Metal Products Company, Detroit, Mich., a corporation of Michigan
Filed Apr. 18, 1960, Ser. No. 22,788
9 Claims. (Cl. 297—355)

This invention relates to a support for the back cushion of seats, and particularly to a support for a back cushion which is adjustable forwardly and rearwardly to desired positions.

While the present invention may be applied to any type of back cushion support which is pivotally attached to an upright frame, the invention is illustrated as being applied to a back cushion which is indirectly connected to the springs of the seat cushion so as to operate in unison therewith.

The seat herein illustrated is of the automotive type having parallel spaced tracks for supporting a seat cushion and having thereon an upstanding support for a back cushion which is pivoted to the seat cushion springs to move vertically in unison therewith. To change the angle of tilt of the back cushion relative to the seat cushion, the end portion of the upright to which the back cushion is pivoted is a separate frame supported on the upper end of the upright. A latch is pivoted on the upright frame for locking the end portion in adjusted position against the tension of a spiral spring which is connected to the upright frame and to the pivot of the end portion thereof to urge the back cushion forwardly when the latch is released. The spring offers resistance to the rearward adjustment of the back cushion since a seated person can exert more force to move the back cushion rearwardly than forwardly.

Accordingly, the main objects of the invention are: to provide an upstanding support for a back cushion of a seat construction having a hinged upward portion which may be moved to different positions for adjusting the tilt of the back cushion; to provide an upright for supporting the back cushion of a seat construction which has at the upper end a pivoted frame which is angularly adjustable relative to the lower portion and which has a frame pivoted thereto for pivotally supporting the back cushion for upward and downward movement with the seat cushion; to provide a support for the back cushion of a seat construction in the nature of an upstanding frame having a pivoted frame secured thereto which supports a second pivoted frame which is connected to the back cushion and urged forwardly by a spring when a latch releases the first said pivoted frame; and in general, to provide an adjustable support for a back cushion which is simple in construction, positive in operation, and economical of manufacture.

Other objects and features of novelty of the invention will be specifically pointed out or will become apparent when referring, for a better understanding of the invention, to the following description taken in conjunction with the accompanying drawings wherein:

FIGURE 1 is a perspective view of a seat having an adjustable back cushion supported by means embodying the present invention;

FIG. 2 is an enlarged broken view in front elevation of the supporting structure for the cushions of the seat illustrated in FIG. 1;

FIG. 3 is an enlarged broken view of the structure illustrated in FIG. 2, as viewed from the right-hand side thereof, with the back cushion disposed in an intermediate position;

FIG. 4 is a view of the structure illustrated in FIG. 3 with parts broken away, with the back cushion in the forward adjusted position;

FIG. 5 is a broken view of the structure illustrated in FIG. 4 with the back cushion in the rearmost adjusted position;

FIG. 6 is an enlarged sectional view of the structure illustrated in FIG. 2, taken on the line 6—6 thereof;

FIG. 7 is a view in side elevation of a seat structure similar to that illustrated in FIG. 1, showing a further form of the invention, and FIG. 8 is a plan view of the seat structure illustrated in FIG. 7.

A pair of spaced tracks 10 and 11 support a seat cushion 12 in fixed relation or for movement forwardly and rearwardly or for both vertical and horizontal movement, as is the conventional practice in the art. In the present arrangement, the seat cushion 12 is secured directly to the tracks 10 or 11 in the conventional manner. A back cushion 13 is supported on an upright frame 14 and is provided with forwardly extending arms 15 which are secured at both sides of the seat cushion on pivots 16 for unison vertical movement therewith. The unison arrangement between the cushions 12 and 13 is more clearly illustrated and specifically described and claimed in the patent to H. C. Flint No. 2,925,120, dated February 16, 1960, under which the assignee of the present invention is an exclusive licensee. The upright supporting structure 14 embodies angle members 17 which are welded or otherwise secured to the rear ends of the seat supporting tracks 10 and 11 and are interconnected by a crossbar 18 which is welded at both ends to a flange of the angle members 17.

A frame 19 has a U-shaped cross member 21 with upstanding flanges 22 to which links 23 are welded or otherwise received. A stub shaft 24 is secured to the link 23 and the flange 22 at the right-hand side of the assembly as illustrated in FIG. 2. The stub shaft 24 extends through an aperture 25 in the forwardly extending flange 26 of the right-hand angle member 17. After the stub shaft is advanced through the aperture the opposite link 23 and flange 22 are secured by a shouldered bolt 27 to the forwardly extending flange 28 of the left-hand angle member 17. This permits the attachment and removal of the frame 19 from the angle members 17. A U-shaped frame 31 has pivots 32 at opposite ends which are secured to apertures 33 in the upper end of the links 23, the links 23 being bent rearwardly from the portion secured to the cross member 21. The second pivoted frame 31 is secured by pivots 34 to the upwardly extending bars 35 of the back cushion. The bars 35 extending forwardly at the bottom forming the arms 15 above referred to, which are connected to the pivots 16, as more fully described in the above mentioned patent.

The stub shaft 24 has a slot 37 therein for receiving the end 38 of a spiral spring 39, the opposite reversely bent end 41 of which is secured over a pin 42 extending outwardly from the flange 26 of a right-hand angle member 17. The spring produces a bias between the stub shaft 24 and the frame 21 for turning the frame counterclockwise and therefore urging the back cushion of the seat forwardly.

The lower end of the links 23 has a notch 43 therein into which a latch 44 extends to maintain the rear cushion centrally of the forward and rearward positions. A post 45 has an end 46 extending through an aperture in a flange 47 of the right-hand angle member 17 and swaged to form a head 48 which secures the post on the flange. A threaded aperture 49 on the outer end of the post receives the threaded end of a bolt 51 which has a shouldered portion 52 extending through an aperture in the latching arm 53 of the latch 44. The latching arm 53 extends through a slot 54 in the flange 26 and extends laterally at 55 and outwardly to form a handle portion 56, which is grasped by the operator and moved downwardly to release the latching arm 53 from the link 23. A coil spring 57 has one end secured over the cross brace 18 and the opposite end hooked into an aperture 58 in the forward end of the latching arm 53 to urge it toward latching position.

When the seat back is to be tilted forwardly, the handle portion 56 is moved downwardly releasing the latching arm 53 from the notch 43, permitting the spring 39 to move the back cushion forwardly into the position illustrated in FIG. 4. Upon the release of the handle 56 the latching arm will be moved upwardly by the spring 57 to intercept the forward surface of the link 23 to thereby retain the intermediate frame 19 in advanced counter-clockwise position. When the back cushion is to be moved to its rearmost position, the handle position 56 of the latch is moved down to have the forward face of the link 23 released. The occupant of the seat pushing backwardly against the back cushion causes the frame to move backward and the links 23 to tilt clockwise until the flange 47 is in engagement with the rear face of the adjacent link as illustrated in FIG. 5. Upon the release of the handle portion 56 the latching arm 53 is moved upwardly by the spring 57 to intercept the rear face of the elements 23 to thereby retain the back cushion in its rearmost position. An intermediate position may be selected when the seat back is pushed back only a sufficient amount or moved forward a sufficient amount to have the latching arm 53 of the latch engage the notch 43 at the end of the adjacent link 23. It is to be understood, that more of the notches 43 may be provided in a wider face at the end of the adjacent link 23 to thereby have more adjustable postions to the back cushion if this should prove desirable. However, for the seat herein illustrated, it was found that the three postively locked positions specifically described above, were sufficient to produce comfort to the seat occupant.

Referring to FIGS. 6, 7 and 8, a further form of the invention is illustrated, that wherein the adjustable supporting portion of the back is disposed within a forwardly presenting U-shaped frame 61 which encloses the rear portion of the seat cushion 12 and the back cushion 13. This construction is used where a seat is employed in the rear thereof and may be applied to a bucket-type seat or to a seat which extends across the entire width of the vehicle body as illustrated in FIG. 8. The handle portion 56 of the latch extends through a slot 62 in the U-shaped element 61. The U-shaped element 61 is herein illustrated as being attached to the floor by brackets 63 with the lower portion of the element 61 cut out between the brackets at 64 to provide feet room for an occupant in the rear thereof. When the seat is used in a truck wherein the support for the back is disposed adjacent to the rear panel of a cab, the element 61 need not be employed.

What is claimed is:

1. An adjustable device for a seat back including in combination, an upstanding frame, a second frame pivoted to said first frame in extension thereof, a third frame pivoted to said second frame in extension thereof and pivoted to said seat back, and latch means on said upstanding frame engageable with one of said other frames for retaining the back in different tilted positions.

2. An adjustable support for a seat back including in combination, an upstanding frame comprising interconnected side members at least one of which has an outward directed flange, an intermediate frame having a pair of links interconnected by a cross member, means for pivotally supporting the links on the spaced uprights, a third frame pivoted to said intermediate frame and to said seat back, a spring for biasing said intermediate frame to a forwardly adjusted position, and latch means on said upstanding frame for retaining said intermediate frame in adjusted position.

3. In a seat construction, a support for a seat cushion, a support for a back cushion secured to the seat support, said back cushion support comprising a pair of upstanding members having forwardly extending flanges and portions extending inwardly toward each other, a cross brace interconnecting said members and spacing said flanges a predetermined distance apart, an intermediate frame having side flanges spaced apart by cross members, means for pivoting said intermediate frame to said flanges of said upstanding members, a third frame of U-shape, pivot means connecting the U-shaped frame to the intermediate frame, and a seat back secured to the ends of said U-shaped frame.

4. In a seat construction, a support for a seat cushion, a support for a back cushion secured to the seat support, said back cushion support comprising a pair of upstanding members having forwardly extending flanges and portions extending inwardly toward each other, a cross brace interconnecting said members and spacing said flanges a predetermined distance apart, an intermediate frame having side flanges spaced apart by cross members, means for pivoting said intermediate frame to said flanges of said upstanding members, a third frame of U-shape, pivot means connecting the U-shaped frame to the intermediate frame, a seat back secured to the ends of said U-shaped frame, and pivoted latch means carried by one of said upstanding members engageable with one of said pivoted frames to maintain the seat back in adjusted position.

5. In a seat construction, a support for a seat cushion, a support for a back cushion secured to the seat support, said back cushion support comprising a pair of upstanding members having forwardly extending flanges and portions extending inwardly toward each other, a cross brace interconnecting said members and spacing said flanges a predetermined distance apart, an intermediate frame having side flanges spaced apart by cross members, means for pivoting said intermediate frame to said flanges of said upstanding members, a third frame of U-shape, pivot means connecting the U-shaped frame to the intermediate frame, a seat back secured to the ends of said U-shaped frame, pivoted latch means carried by one of said upstanding members engageable with one of said pivoted frames to maintain the seat back in adjusted position, and spring means for biasing said intermediate frame toward a forward position.

6. In a seat construction, a seat cushion, a back cushion, support means for said seat cushion, support means for said back cushion, said seat cushion having resilient means therein, pivots supported by said resilient means, forwardly extending arms on the back cushion secured to said pivot means, said back supporting means comprising a fixed frame extending upwardly, an intermediate frame pivoted thereto, and a third frame pivoted to said intermediate frame and to said back cushion.

7. In a seat construction, a seat cushion, a back cushion, support means for said seat cushion, support means for said back cushion, said seat cushion having resilient means therein, pivots supported by said resilient means, forwardly extending arms on the back cushion secured to said pivot means, said back supporting means comprising a fixed frame extending upwardly, an intermediate frame pivoted thereto, a third frame pivoted to said intermediate frame and to said back cushion, spring means urging said intermediate frame in a forward direction, and latching means for retaining said intermediate secured to said back cushion support means.

8. In a seat construction, a first frame, a second frame pivoted near one edge of said first frame and extending upwardly therefrom, a third frame pivoted to said second frame and disposed in extension thereof, one of said frames having notch means therein at one side thereof, latch means pivoted to another of said frames and located adjacent to said notch means with which it is engageable in a plurality of different angular positions of said one and another frames, and spring means connected between said two angularly adjustable latchable frames to provide a bias in one direction therebetween.

9. In a seat construction, a first frame, a second frame pivoted near one edge of said first frame and extending upwardly therefrom, a third frame pivoted to said second frame and disposed in extension thereof, one of said frames having notch means therein at one side thereof, latch means pivoted to another of said frames and located adjacent to said notch means with which it is engageable in a plurality of different angular positions of said one and another frames, spring means connected between said two angularly adjustable latchable frames to provide a bias in one direction therebetween, and spring means for urging said latch means into engagement with said notch means.

References Cited in the file of this patent
UNITED STATES PATENTS

| | | |
|---|---|---|
| 1,275,067 | Mertz | Aug. 6, 1918 |
| 1,449,401 | Headley | Mar. 27, 1923 |
| 1,970,800 | Herreshoff | Aug. 21, 1934 |
| 2,426,336 | Binus | Aug. 26, 1947 |
| 2,602,487 | Flint | July 8, 1952 |
| 2,834,402 | Lautier | May 13, 1958 |